(12) United States Patent
Zheng et al.

(10) Patent No.: US 10,614,323 B2
(45) Date of Patent: Apr. 7, 2020

(54) SCENE ANALYSIS METHOD AND VISUAL NAVIGATION DEVICE

(71) Applicant: Nanjing Yuanjue Information and Technology Company, Nanjing (CN)

(72) Inventors: Liming Zheng, Nanjing (CN); Tao Yu, Nanjing (CN); Bingbing Cui, Nanjing (CN)

(73) Assignee: Nanjing Yuanjue Information and Technology Company, Nanjing (CN)

( * ) Notice: Subject to any disclaimer, the term of this patent is extended or adjusted under 35 U.S.C. 154(b) by 262 days.

(21) Appl. No.: 15/798,429

(22) Filed: Oct. 31, 2017

(65) Prior Publication Data

US 2019/0012549 A1    Jan. 10, 2019

(30) Foreign Application Priority Data

Jul. 10, 2017    (CN) .......................... 2017 1 0555906

(51) Int. Cl.
*G06K 9/00* (2006.01)
*G08G 9/02* (2006.01)
*G06K 9/62* (2006.01)
*G08G 1/0967* (2006.01)
*G08G 1/16* (2006.01)
*G06K 9/32* (2006.01)

(52) U.S. Cl.
CPC ....... *G06K 9/00805* (2013.01); *G06K 9/6218* (2013.01); *G08G 1/096725* (2013.01); *G08G 1/166* (2013.01); *G08G 9/02* (2013.01); *G06K 9/6267* (2013.01); *G06K 2009/3291* (2013.01)

(58) Field of Classification Search
CPC ............. G06K 9/00805; G06K 9/6218; G06K 2009/3291; G06K 9/6267; G08G 1/166; G08G 1/096725; G08G 9/02

USPC .......................................................... 382/103
See application file for complete search history.

(56) References Cited

U.S. PATENT DOCUMENTS

| | | | |
|---|---|---|---|
| 6,944,544 B1 * | 9/2005 | Prakah-Asante | ... B60R 21/0134 342/42 |
| 2003/0152145 A1 * | 8/2003 | Kawakita | ................. H04N 5/77 375/240.12 |
| 2008/0166015 A1 * | 7/2008 | Haering | ................. G01S 3/7864 382/103 |
| 2011/0261193 A1 * | 10/2011 | Agurok | ................... F41H 13/00 348/135 |

FOREIGN PATENT DOCUMENTS

WO    WO-2017077261 A1 *   5/2017    ......... G06K 9/00805

* cited by examiner

*Primary Examiner* — Amandeep Saini
(74) *Attorney, Agent, or Firm* — Anna Tsang

(57) ABSTRACT

A scene analysis method is applied to a visual navigation device. The scene analysis method includes the steps of capturing scene information at different times based upon the field of view of an image capturing device; analyzing different targets existing in the captured scene information; comparing each one of the targets captured at different times to classify the target, wherein the target that is in a specific region in the field of view and moving toward the image capturing device is classified as a type A target; otherwise the target is classified as a type B target. When the visual navigation is installed on a vehicle, a protection procedure such as a procedure of avoiding an obstacle is initiated when a type A target is detected, so that the vehicle is automatically prevented from potential accidents.

18 Claims, 8 Drawing Sheets

SCENE ANALYSIS METHOD AND VISUAL NAVIGATION DEVICE

BACKGROUND OF THE INVENTION

1. Field of the Invention

The invention relates to an image analyzing technique and, in particular, to a scene analyzing method and a navigation device that utilizes the same.

2. Description of Related Art

Vehicle auto pilot receives a lot of attention in recent years. Many related techniques have been proposed. A vehicle can sense a wider range using sensors installed thereon and thus automatically react safely according to potential dangers in the environment. Moreover, its reactions are more rapid and accurate than human beings. Besides, auto pilot can reduce traffic accidents caused by human factors such as driving aggressively or absent-mindedly.

Most of the auto pilot and navigation systems utilize multi-view identification to analyze scenes for depth detection and object identification. However, multi-view identification requires the use of multiple image capturing devices in order to collect sufficient image data.

SUMMARY OF THE INVENTION

To optimize the processing speed of image recognition, reduce the burden of the image processing device, and adapt to requirements of navigation and auto pilot, the invention proposes a scene analyzing method. The scene analyzing method includes the steps of:

capturing scene information at different times based upon the field of view of an image capturing device;

analyzing different targets existing in the captured scene information;

comparing a target in the scene information captured at different times and classifying the target that is in a specific region in the field of view and moving toward the image capturing device as a type A target; and classifying the target as a type B target otherwise.

The invention also provides a visual navigation device utilizing the above-mentioned scene analyzing method. The disclosed visual navigation device includes:

a mobile carrier;

an image capturing device installed on the carrier;

an image analyzing device connected to the image capturing device for receiving and analyzing images collected by the image capturing device;

a control module connected to the image analyzing device to obtain an analyzing result from the image analyzing device and controlling the motion of the carrier based upon the analyzing result.

By use of super pixel clustering recognition and spiral sampling monocular vision spatial depth sensing technology, the invention simulates the object recognition process of human eyes. From the differences in positions in a visual field, phase information is appended to the recognition process. Therefore, the invention only needs a monocular vision device to realize distance positioning. At the same time, the method increases the speed of visually sensing the scene information. It optimizes the application of visual sensing technology in navigation.

DETAILED DESCRIPTION OF THE PREFERRED EMBODIMENT

Figure 1:
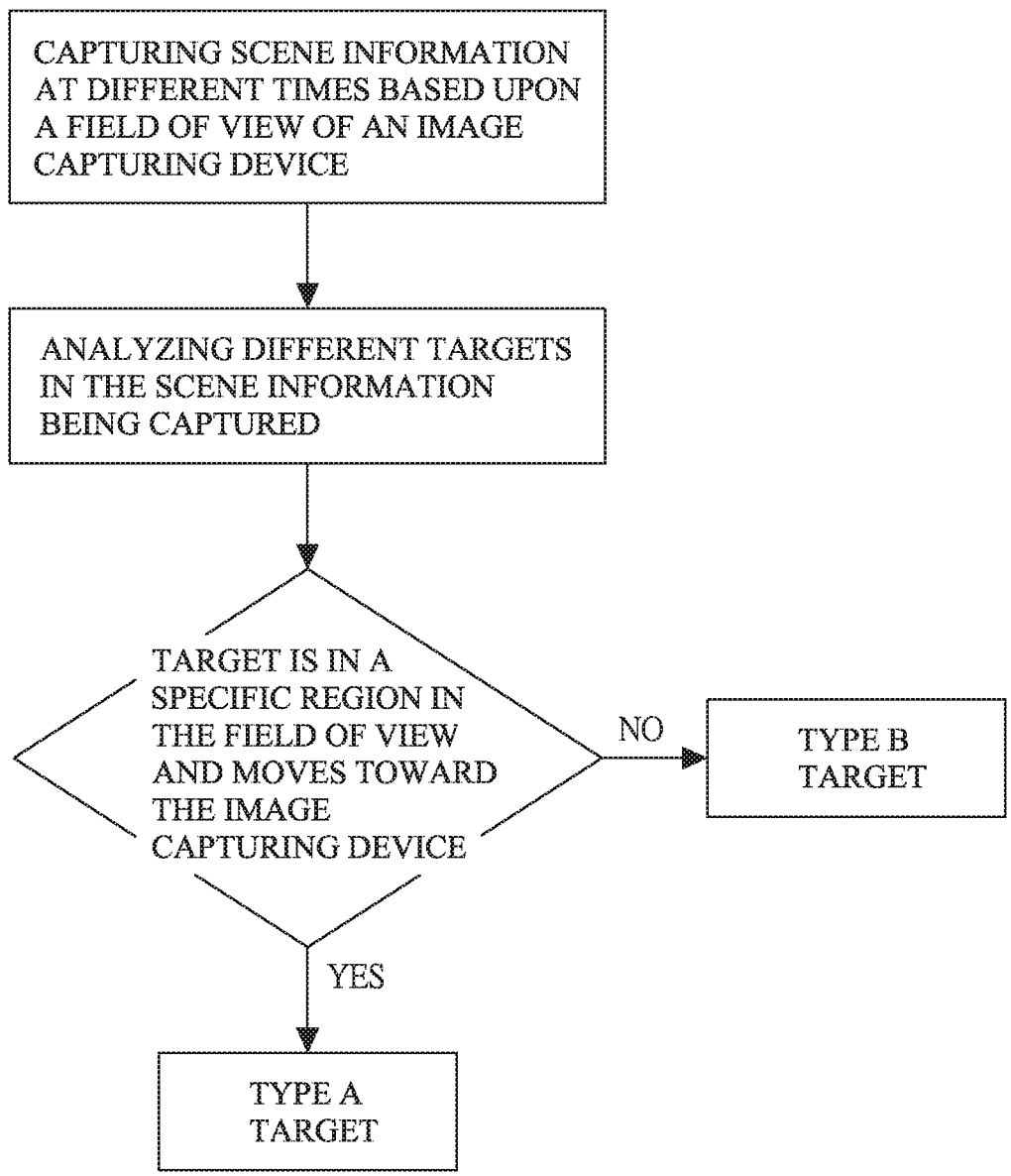
FIG. 1 is a flowchart of a scene analyzing method in accordance with the present invention.

FIG. 1 is a flowchart of a scene analyzing method in accordance with the present invention, the method comprising following steps:

a. capturing scene information at different times based upon a field of view of an image capturing device;

b. analyzing different targets existing in the captured scene information; and c. comparing one of the targets in the scene information captured at different times and classifying the target that is in a specific region in the field of view and moving toward the image capturing device as a type A target, and classifying the target as a type B target otherwise.

In a preferred embodiment of the scene analyzing method, the image capturing device is a monocular image capturing device.

In a preferred embodiment of the scene analyzing method, the different targets existing in the scene information are analyzed using a method for monocular vision space recognition in quasi-earth gravitational field environment in step b, thereby analyzing the targets therein. More explicitly, the method for monocular vision space recognition in quasi-earth gravitational field environment involves the following steps:

(1) Perform a super pixel image partition for the scene information based upon pixel colors and spatial positions;

(2) Utilize a super pixel feature-based spectral clustering algorithm to reduce the dimension of the super pixels to a large block clustering image. Preferably, the features used in the spectral clustering algorithm include, but not limited to, super pixel color space distance, texture feature vector distance, and geometrical adjacency.

(3) Classify the large block clustering image. More explicitly, according to models of sky, ground and objects along with the image perspective, a fuzzy distribution density function of the gravity field is constructed. The density function is used to compute an expectation value for each large block pixel, thereby classifying the large block pixels and forming a classification diagram.

(4) For the classification diagram done with the preliminary classification, perform characteristic classification algorithms such as wavelet sampling and Manhattan direction extraction to extract an accurate classification diagram of the sky, ground and objects, thereby identifying different targets in the scene information.

According to a preferred embodiment of the scene analyzing method, the image capturing device captures scene information at different times in a continuous or discrete way in step a. In step b, the scene information captured at different times is analyzed using the above-mentioned recognition method to recognize different targets in the scene information at different times.

According to a preferred embodiment of the scene analyzing method, each scene information and the targets therein are analyzed using an aperture imaging model and ground linear perspective information to find their depths after the scene information clustering identification is done. The planar scene information obtained by the monocular image capturing device is converted into three-dimensional (3D) scene information, so that the relative position of each target with respect to the image capturing device can be estimated based on the area occupied by the target in the field of view. Preferably, in addition to the area occupied by the target in the field of view, the criteria also include, but not limited to, one or a combination of such features as the number of super pixels occupied by the target in the scene information, the profile size of the target, the distance from the target to the center of the scene information, and the distance from the target to the edges of the scene information. This estimates the relative position between each target and the image capturing device.

According to a preferred embodiment of the scene analyzing method, in step c, when determining whether the target is in a specific region, the specific region may be the region within a safety threshold distance from the image capturing device. If inside the specific region, the target is closer to a center of the field of view and thus closer to the image capturing device. This indicates that the target is about to have a collision with the image capturing device. The center of the field of view is on an optical axis of an imaging system of the image capturing device. The region may be determined based upon one or multiple of the following factors: the position of the target, the distance between the target and the image capturing device, the size of the image capturing device, the moving speed of the image capturing device, the relative speed between the image capturing device and the target, and the minimal distance for the image capturing device to stop or avoid the target. When the image capturing device is installed on a carrier, the size of the carrier should also be taken into account.

Figure 2:
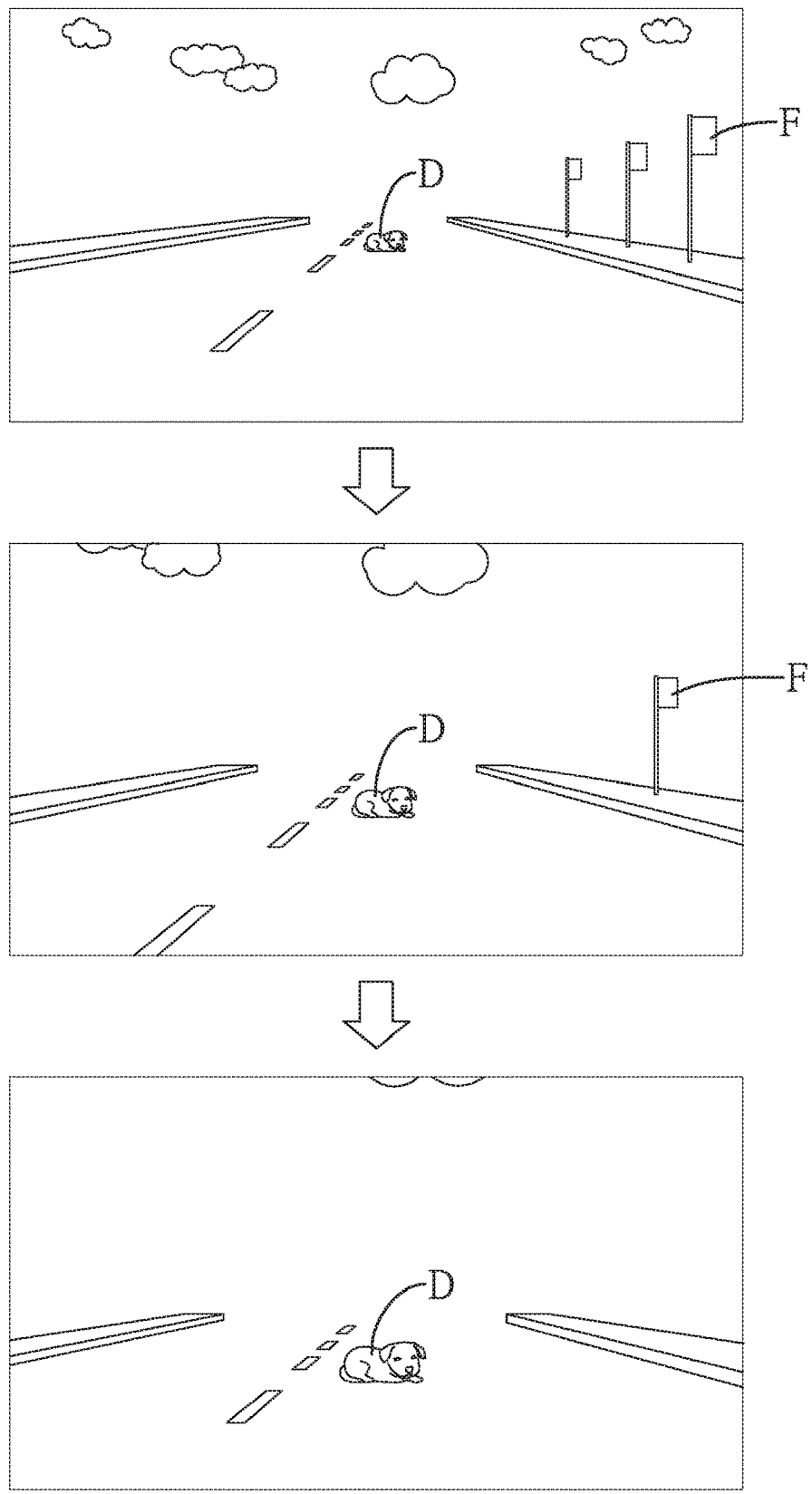
FIG. 2 shows scene information captured by an image capturing device in accordance with the present invention, indicating that a target is moving toward the image capturing device.

In step c, determining whether the target is moving toward the image capturing device may be done by analyzing how the relative positions of the target and the image capturing device vary with time in the scene information captured at different times. When the targets in the scene information at different times are compared, the features of each of the targets in the scene information at each moment are analyzed to compare the targets at different times. If the features satisfy some consistency conditions, the targets are set as the same target. For the same target, as shown in FIG. 2, if the relative position between the target and the image capturing device in earlier scene information is farther (i.e., the target occupies fewer super pixels in the earlier scene information) than that in later scene information (i.e., the target occupies more super pixels in the later scene information), then it is determined that the target and the image capturing device are moving toward each other.

Figure 3:
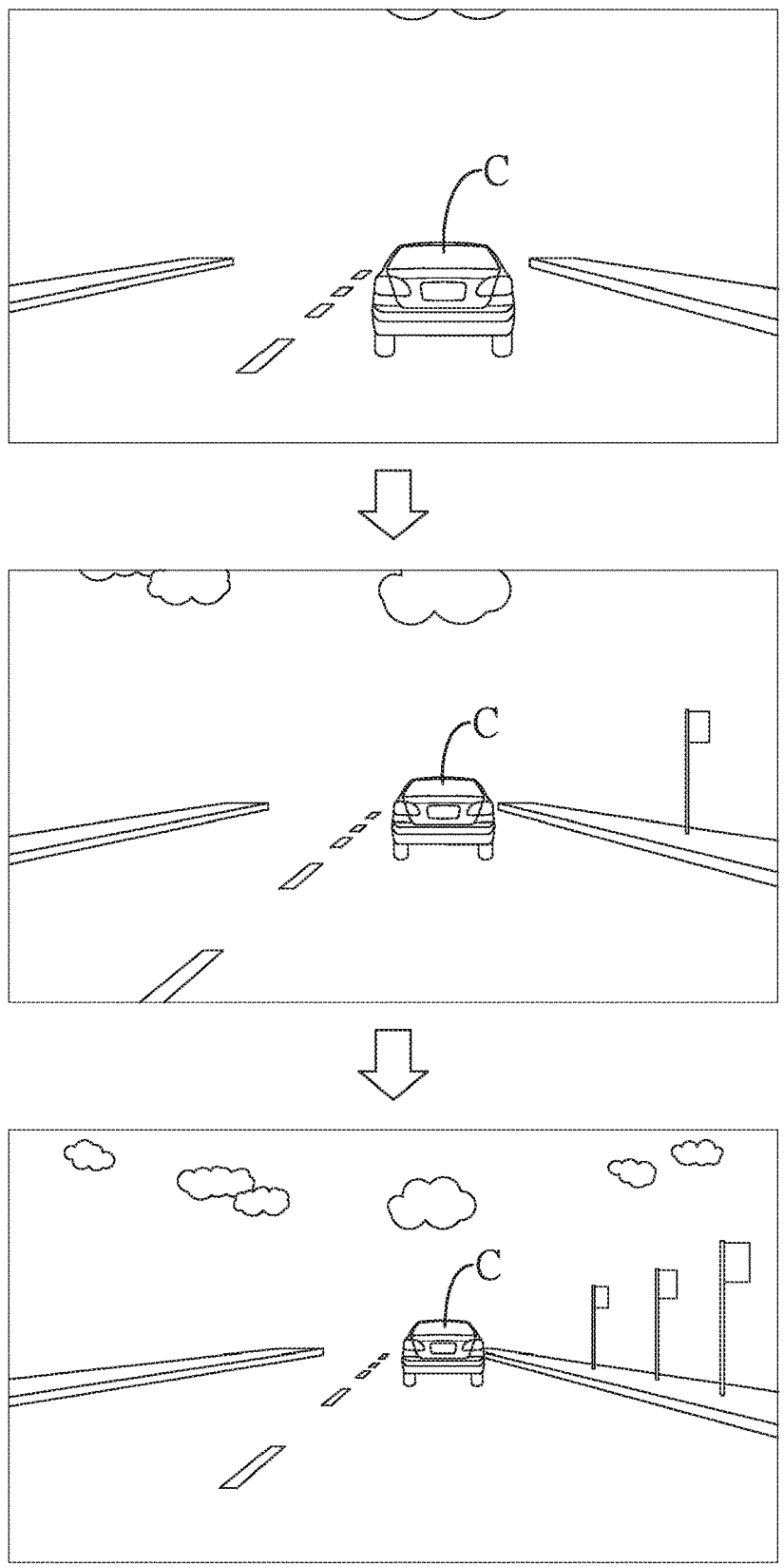
FIG. 3 shows scene information captured by the image capturing device in accordance with the present invention, indicating that a target is moving away from the image capturing device.

On the other hand, as shown in FIG. 3, if the relative position between the target and the image capturing device in earlier scene information is closer (i.e., the target occupies more super pixels in the earlier scene information) than that in later scene information (i.e., the target occupies fewer super pixels in the later scene information), then it is determined that the target and the image capturing device are moving away from each other.

If the target suddenly disappears from the captured scene information at a later time, then the disappearing position is used to determine whether the disappearing of the target is normal. If the disappearing position of the target is at an edge of the field of view in the scene information, then the disappearing of the target is normal. If the disappearing position of the target is not at an edge, then the disappearing of the target is abnormal. In the case of an abnormal disappearing, the relative positions of the target are recorded. The system then looks for the target in even later scene information until the target is discovered again. When the target appears again, the relative positions of the target at different scene information are further compared to determine how the target moves. Preferably, in order to save the device cost in actual operations, the stored relative positions of the target are kept only for a storing time. Once the time passes beyond the storing time, the relative positions of the target will be discarded. The storing time can be determined by the relative position of the target with respect to the image capturing device when the target disappears and the speed of the image capturing device.

In step c, determining the target as a type A target or a type B target depends on the position of the target and the relative motion between the target and the image capturing device. As shown in FIG. 2, from the scene information captured at different times, it is seen that the target D, a dog, is moving toward the image capturing device, and is at the center of the image. Based upon the position of the target D, the size of the target D, and the distance between target D and the image capturing device, target D is determined to be inside the specific region. Therefore, target D is a type A target. As shown in FIG. 2, the target F, a flag, can be seen to be moving away from the image capturing device according to the scene information at different times. However, target F is at an edge of the image. At the same time, based upon the position of target F, the size of target F, and the distance between target F and the image capturing device, target F is not inside the specific region. Thus, target F is a type B target. As shown in FIG. 3, the target C, a car, is seen to be moving away from the image capturing device according to the scene information at different times. Even though target C is at the center of the image, target C is still a type B target as judged from the position of target C, the size of target C, and the distance between target C and the image capturing device.

Figure 4:
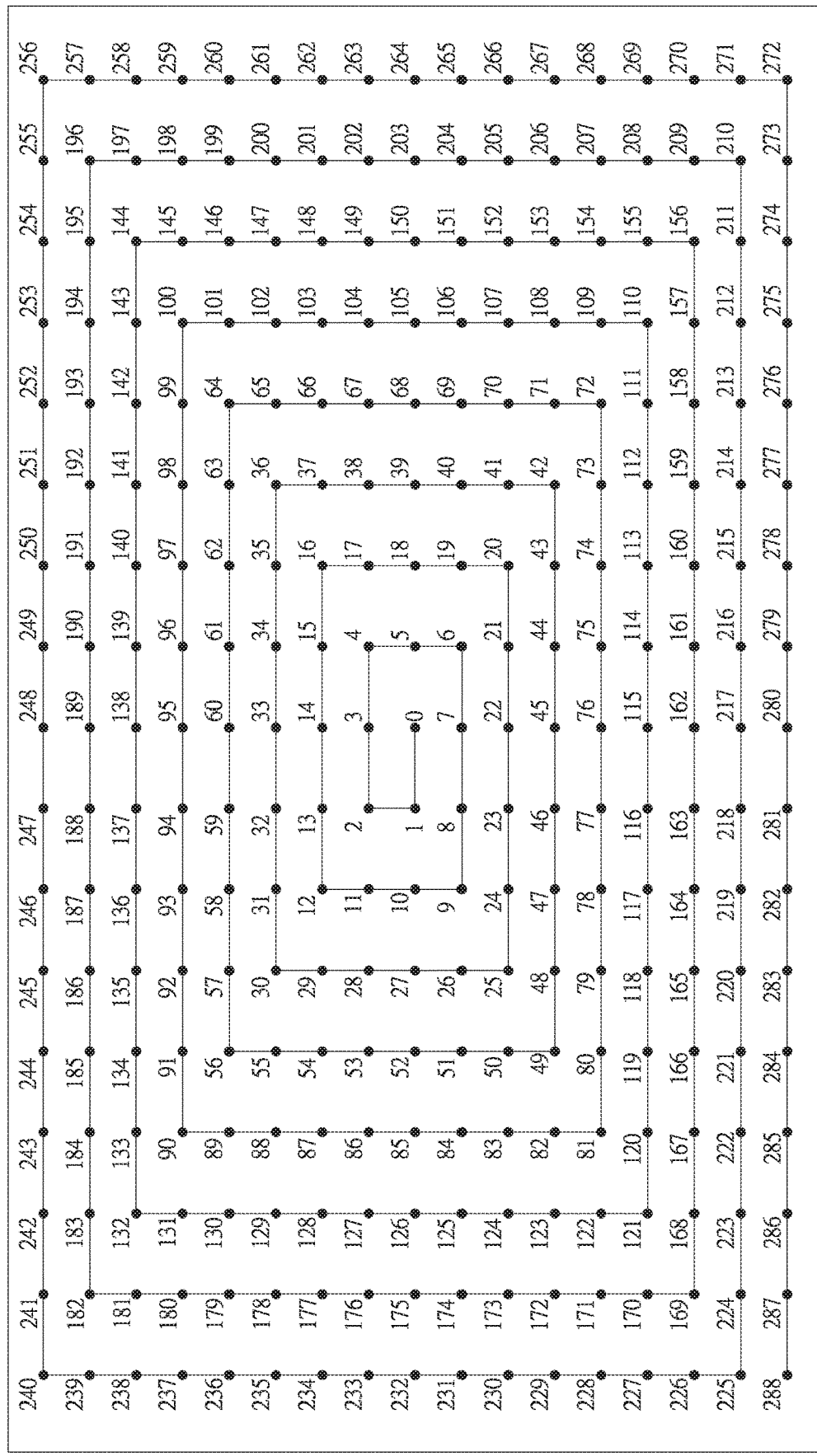
FIG. 4 shows a spiral curve used for sampling according to the invention.

In a preferred embodiment of the scene analyzing method, as shown in FIG. 4, the image capturing device uses a spiral curve to sample a plurality of points or grids to analyze the scene information. The spiral curve starts from the center of the field of view.

In one embodiment, the plurality of sampled points or grids may be given descending numerals from the starting point of the spiral curve to the end. Preferably, the sampled points or grids are distributed at equal intervals along the spiral curve. In another embodiment, the pluralities of sampled points or grids are given ascending numerals from the starting point of the spiral curve to the end. More specifically, the number of the sampling points or grids is the square of an odd number. In this embodiment, the odd number is 17 and there are 289 sampling points on the spiral curve. More preferably, the end of the spiral curve is close to an edge of the field of view. As shown in FIG. 4, the spiral curve ends at a corner of the field of view. The sampling points and grids present a specific pattern. As shown in the drawing, the spiral curve winds clockwise. In this case, the sampling points or grids along the diagonal from the center to the upper right corner are labeled as $(2n)^2$, where n is the winding number of the spiral curve and the center has n=0. The sampling points or grids along the diagonal from the center to the lower left corner are then labeled as $(2n-1)^2$. The sampling points or grids along the diagonal from the center to the upper left corner are labeled as $(2n)^2-2n$. The sampling points or grids along the diagonal from the center to the lower right corner are labeled as $(2n-1)^2-(2n-1)$. According to the above-mentioned rule, the position of each sampling point or grid can be quickly identified according to the numeral thereof.

After using the spiral curve to label the sampling points or grids in the field of view, the sampling points or grids can be used as a base to perform super pixel partitions to targets in the scene information and clustering recognition, to sense the depths of the targets, to estimate the relative position of the targets, to confirm the target positions, to determine how the targets and the image capturing device are moving relative to one another. Through the numbered sampling points or grids and their relations with respect to the above-mentioned corners, it is possible to quickly specify super pixels, clustering recognition large blocks, and target positions. It is easy to determine the position of the target and the distance between the target and the image capturing device. Furthermore, according to the number of the sampling points or grids covered by the target and the depth of the scene information, it is able to quickly determine the size of the area covered by the target, the number of super pixels covered by the target, the profile of the target, the distance between the target and the center of the field of view, and the distance between the target and the edge of the field of view. Therefore, the position relationship between the target and the image capturing device can be obtained.

In one embodiment, the number of the sampling points or grids that enclose a profile of the same target is used as a criterion to determine whether the target is in the specific region and is moving toward the image capturing device in the field of view. By comparing the number of the sampling points or grids of the same target captured at different times, whether the target is in the specific region and is moving toward the image capturing device in the field of view can be determined.

When perform the clustering analysis of the target, the scene analysis method of the present invention may use an image processing method disclosed in the Chinese Patent application number 201510068199.6, the sampling points or grids can be used as seeds for clustering operations, so that the clustering analysis can be faster and more accurate.

The method of the present invention may further comprise a protection procedure such as an obstacle avoiding procedure. When the target is identified as a type A target, the obstacle avoiding procedure is activated to take certain protection actions. The protection actions may include, but not limited to, dodging the type A target, performing a brake or inverse acceleration to stop approaching the type A target.

Figure 5:
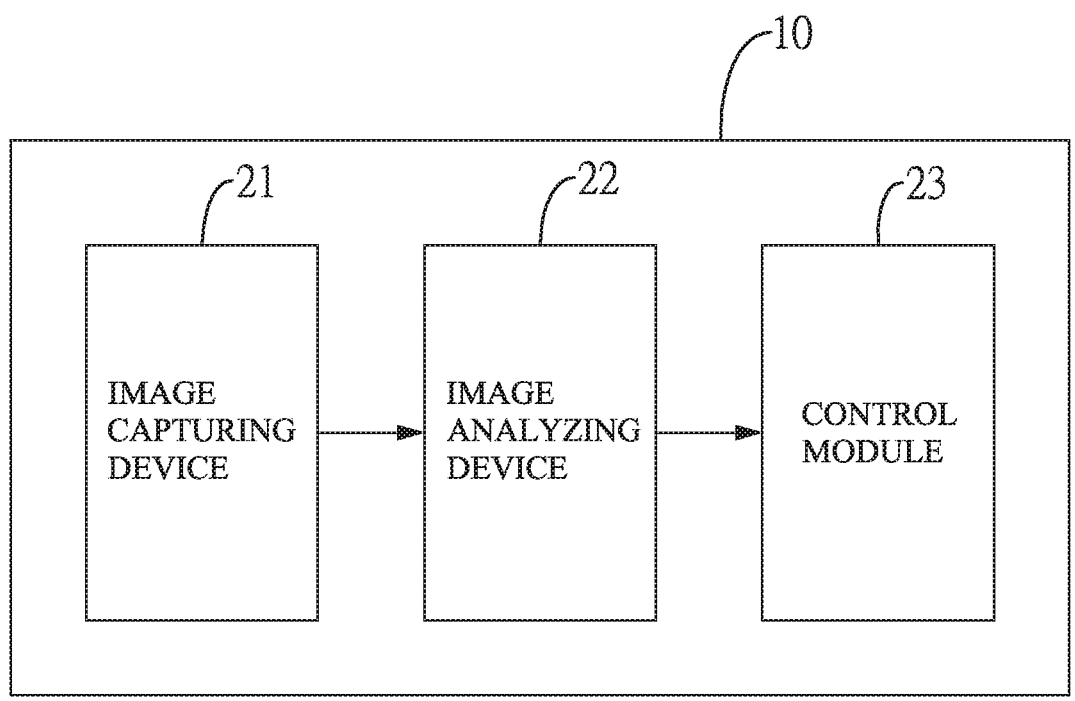
FIG. 5 shows a block diagram of a visual navigation device in accordance with the present invention.

As shown in FIG. 5, a visual navigation device using the above-described scene analysis method comprises a mobile carrier 10, an image capturing device 21 mounted on the mobile carrier 10, an image analyzing device 22 connected to the image capturing device 21 for receiving and analyzing the scene information acquired by the image capturing device 21, and a control module 23 connected to the image analyzing device 22 to obtain an analysis result from the image analyzing device 22. The analysis result is applied to control the mobile carrier 10.

Figure 6:
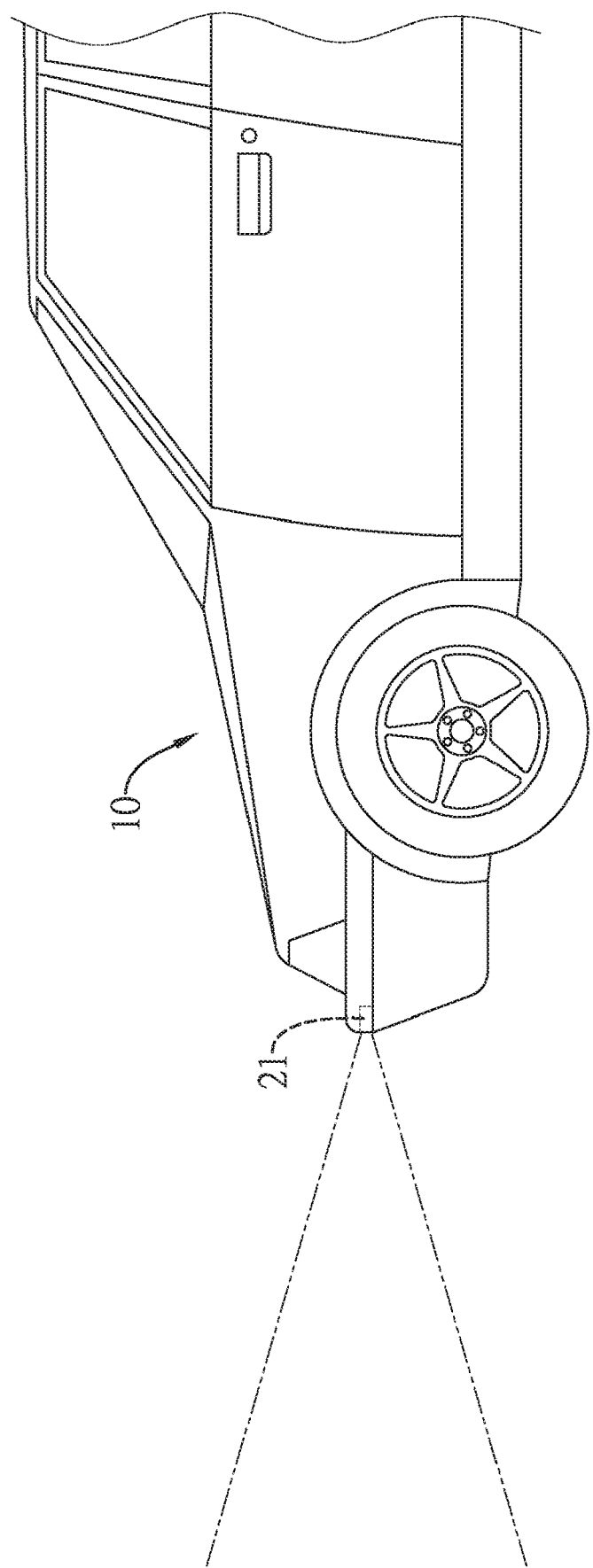
FIG. 6 is a schematic view showing that the image capturing device is installed on a vehicle.

With reference to the embodiment shown in FIG. 6, the mobile carrier 10 is a vehicle. However in practical applications, the mobile carrier 10 is not limited to vehicles, and may be an aircraft, ship, etc. In the present embodiment, the image capturing device 21 is preferably mounted at a lower central position in front of the vehicle. As the vehicle moves, the image analyzing device 22 receives the scene information acquired by the image capturing device 21 analyzes the different targets present in the scene information, and compares the targets in the scene information at different times. If the target is located in a specific region of the field of view and moves toward the image capturing device 21, the target is determined as a type A target, otherwise, the target is determined as a type B target.

If there is a type A target, the image analyzing device 22 sends the analyzing result to the control module 23. The control module 23 will initiate the protection procedure. According to the position relationship, the distance between the type A target and the mobile carrier 10, the relative speed between the type A target and the carrier 10, or a braking distance of the mobile carrier 10 and the possibility for the mobile carrier 10 to avoid the collision, the protection procedure may include an action, such as issuing an alarm, braking the mobile carrier 10 to stop approaching the type A target.

Figure 7:
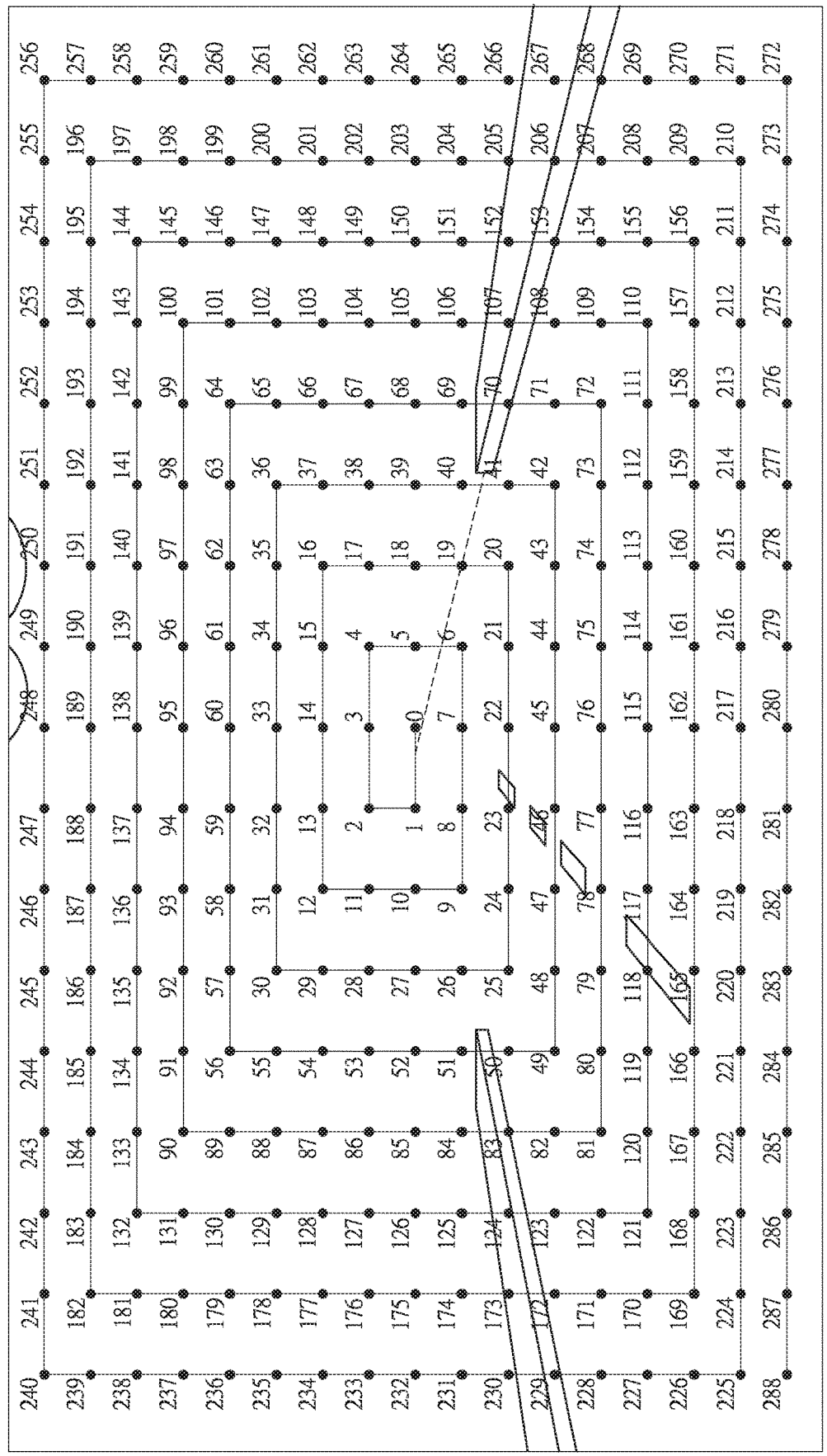
FIG. 7 shows the scene information captured by the image capturing device when the mobile carrier is moving along a straight line.

Preferably, the control module 23 may further perform a navigation correction function. When the mobile carrier 10 moves in a straight line, scenery captured by the image capturing device 21 is shown in FIG. 7. The extensions of the road edges and other objects tend to converge to the center of the field of view, i.e. a virtual vanishing point. The virtual vanishing point is also the sampling point indicated by the reference number zero. As shown in FIG. 7, this is particularly so for a straight road, as shown in FIG. 7.

Figure 8:
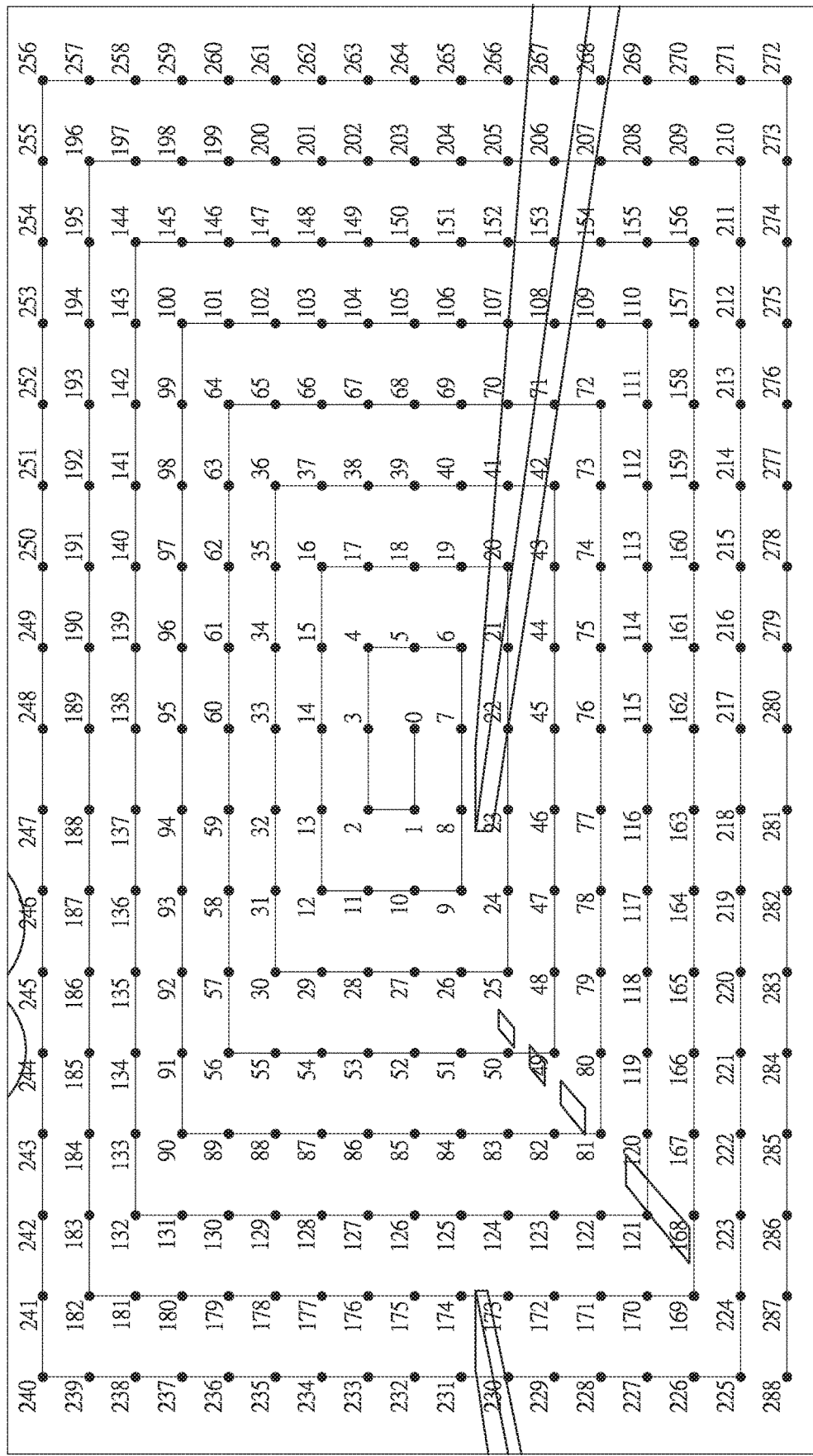
FIG. 8 shows the scene information captured by the image capturing device when the mobile carrier is deviating from a straight line.

However, when the mobile carrier 10 deviates from the originally planned path, due to for example a rough road surface, avoiding an obstacle, or making a turn, the scene information obtained is shown in FIG. 8. In this case, the extensions of the road edge and those of other objects will converge to another position different from the center of the field of view. Thus the control module 23 may perform a correction procedure to correct the travel direction of the mobile carrier 10 in such a way that the extensions of the road edge converge again to the center of the field of view to achieve the correction function.

In one embodiment, when the mobile carrier 10 is moving in a straight line along the road, as shown in FIG. 7, the diagonal lines of the spiral curve and the extension line of the edge of the road substantially extend in the same direction. As the mobile carrier 10 moves along a straight road, the intervals between every two adjacent sampling points on the diagonal line have proportional distances to the extension lines of the road edge.

When the mobile carrier 10 deviates from its original path, as shown in FIG. 8, the diagonal line of the spiral curve and the extension line of the road edge extend in different directions obviously. The intervals between every two adjacent sampling points on the diagonal line no longer have proportional distances to the extension lines of the road edge. The moving direction of the mobile carrier 10 can be corrected by the control module 23, and the diagonal line of the spiral curve and the extension line of the edge of the road may substantially extend in the same direction. The extension lines of the road edges and the extension line of other objects converge again to the center of the field of view, thus achieve the correct function.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scene analysis method comprising the steps of:
    capturing scene information at different times based upon a field of view of an image capturing device;
    analyzing different targets existing in the scene information being captured;
    comparing positions of the same one of the targets captured at different times, wherein the target that is in a specific region in the field of view and moving toward the image capturing device is classified as a type A target, otherwise, the target is classified as a type B target;
    wherein a plurality of sampling points or grids in the scene information are extracted along a spiral curve having a starting point at the center of the field of view.

2. The method of claim 1, wherein the image capturing device is a monocular image capturing device.

3. The method of claim 2, wherein a center of the field of view is on an optical axis of an imaging system of the image capturing device.

4. The method of claim 1, wherein the scene information is analyzed using clustering identification to distinguish different targets in the scene information.

5. The method of claim 1, wherein the plurality of sampling points or grids are distributed along the spiral curve at an equal interval and are sequentially labeled with ascending numerals from the starting point of the spiral curve.

6. The method of claim 1, wherein the number of the plurality of sampling points or grids is the square of an odd number.

7. The method of claim 1, wherein the plurality of sampling points or grids are applied for analyzing the scene information captured at different times.

8. The method of claim 7, wherein the numbers of the sampling points or grids that enclose the profile of the same target captured at different times are used to determine whether the target is in the specific region and is moving toward the image capturing device.

9. The method of claim 7, wherein the numbers of the sampling points or grids occupied by the same target captured at different times are used to determine whether the target is in the specific region and is moving toward the image capturing device.

10. The method of claim 1, wherein a protection procedure is initiated when the target is classified as a type A target.

11. The method of claim 10, wherein the protection procedure is an obstacle avoiding procedure to dodge the type A target.

12. The method of claim 10, wherein the protection procedure is a braking procedure to stop moving toward the type A target.

13. The method of claim 10, wherein an alarm is activated when the protection procedure is initiated.

14. A visual navigation device using the method as claimed in claim 1, the device comprising:
    a mobile carrier;
    an image capturing device installed on the mobile carrier to capture scene information;
    an image analyzing device connected to the image capturing device for receiving and analyzing the scene information;
    a control module connected to the image analyzing device to obtain an analyzing result from the image analyzing device and controlling a motion of the mobile carrier based upon the analyzing result;
    wherein the image analyzing device analyzes the scene information captured by the image capturing device and determines whether the mobile carrier deviates from a path based on relations between diagonal lines of the field of view and captured scenery appearing in the field of view, and a correction function is executed to make the mobile carrier move in a correct way when the mobile carrier deviates from the trajectory.

15. The visual navigation device of claim 14, wherein the image analyzing device analyzes the scene information captured by the image capturing device and determines whether a target appearing in the scene information is a type A target or a type B target, and the control module executes a protection procedure when the target is determined as the type A target.

16. The visual navigation device of claim 14, wherein the mobile carrier is a vehicle and the image capturing device is installed at a lower position in front of the vehicle.

17. The visual navigation device of claim 14, wherein the carrier is an aircraft and the image capturing device is installed at a center in front of the aircraft.

18. The visual navigation device of claim 17, wherein the carrier has another image capturing device installed at a center of a bottom of the aircraft.

* * * * *